United States Patent
Filippi et al.

(10) Patent No.: US 8,414,840 B2
(45) Date of Patent: Apr. 9, 2013

(54) VERTICAL ISOTHERMAL SHELL-AND-TUBE REACTOR

(75) Inventors: Ermanno Filippi, Castagnola (CH); Enrico Rizzi, Casnate con Bernate (IT); Mirco Tarozzo, Ligornetto (CH)

(73) Assignee: Methanol Casale SA (CH)

( * ) Notice: Subject to any disclaimer, the term of this patent is extended or adjusted under 35 U.S.C. 154(b) by 0 days.

(21) Appl. No.: 13/320,410

(22) PCT Filed: Aug. 6, 2010

(86) PCT No.: PCT/EP2010/061517
§ 371 (c)(1),
(2), (4) Date: Nov. 14, 2011

(87) PCT Pub. No.: WO2011/026713
PCT Pub. Date: Mar. 10, 2011

(65) Prior Publication Data
US 2012/0148456 A1   Jun. 14, 2012

(30) Foreign Application Priority Data
Sep. 2, 2009  (EP) .................................. 09169231

(51) Int. Cl.
*B01J 8/02*  (2006.01)
(52) U.S. Cl.
USPC ........... 422/198; 422/200; 422/211; 422/220; 422/239
(58) Field of Classification Search .................. 422/198, 422/200, 211, 220, 239
See application file for complete search history.

(56) References Cited

U.S. PATENT DOCUMENTS

| | | | |
|---|---|---|---|
| 6,365,114 B1 * | 4/2002 | Marold | 422/200 |
| 2002/0106539 A1 * | 8/2002 | Chong et al. | 429/19 |
| 2004/0184976 A1 | 9/2004 | Pagani et al. | |
| 2004/0266893 A1 | 12/2004 | Filippi et al. | |
| 2005/0061490 A1 | 3/2005 | Filippi et al. | |
| 2010/0129283 A1 | 5/2010 | Filippi et al. | |
| 2010/0135871 A1 | 6/2010 | Filippi et al. | |
| 2010/0284869 A1 | 11/2010 | Rizzi et al. | |

FOREIGN PATENT DOCUMENTS

| | | |
|---|---|---|
| EP | 1279915 A1 | 1/2003 |
| EP | 1900424 A1 * | 3/2008 |

OTHER PUBLICATIONS

International Preliminary Report on Patentability in connection with PCT/EP2010/061517, Sep. 23, 2011.
Response to Written Opinion in connection with PCT/EP2010/061517, Aug. 8, 2011.

* cited by examiner

*Primary Examiner* — Jennifer A Leung
(74) *Attorney, Agent, or Firm* — Akerman Senterfitt

(57) ABSTRACT

Isothermal vertical reactor (1) for a chemical reaction, comprising a shell (2) with internal gas-permeable walls (16, 18) defining an inlet distribution chamber (17) and a product collecting chamber (19), an open-top catalytic bed between said gas-permeable walls, and a tube heat exchanger (5) embedded in said catalytic bed, the tube heat exchanger (5) comprising a bundle of U-tubes, where an inlet (14) is disposed to direct a fresh charge in an upper chamber (21) over the catalytic bed and the U-shaped top portion of the tube bundle; a portion (F1) of the fresh charge passes through the catalytic bed with a mixed axial-transversal flow, and another portion (F2) of the fresh charge enters the inlet gas-distribution chamber (17) and passes through the catalytic bed with a substantially transversal flow.

6 Claims, 1 Drawing Sheet

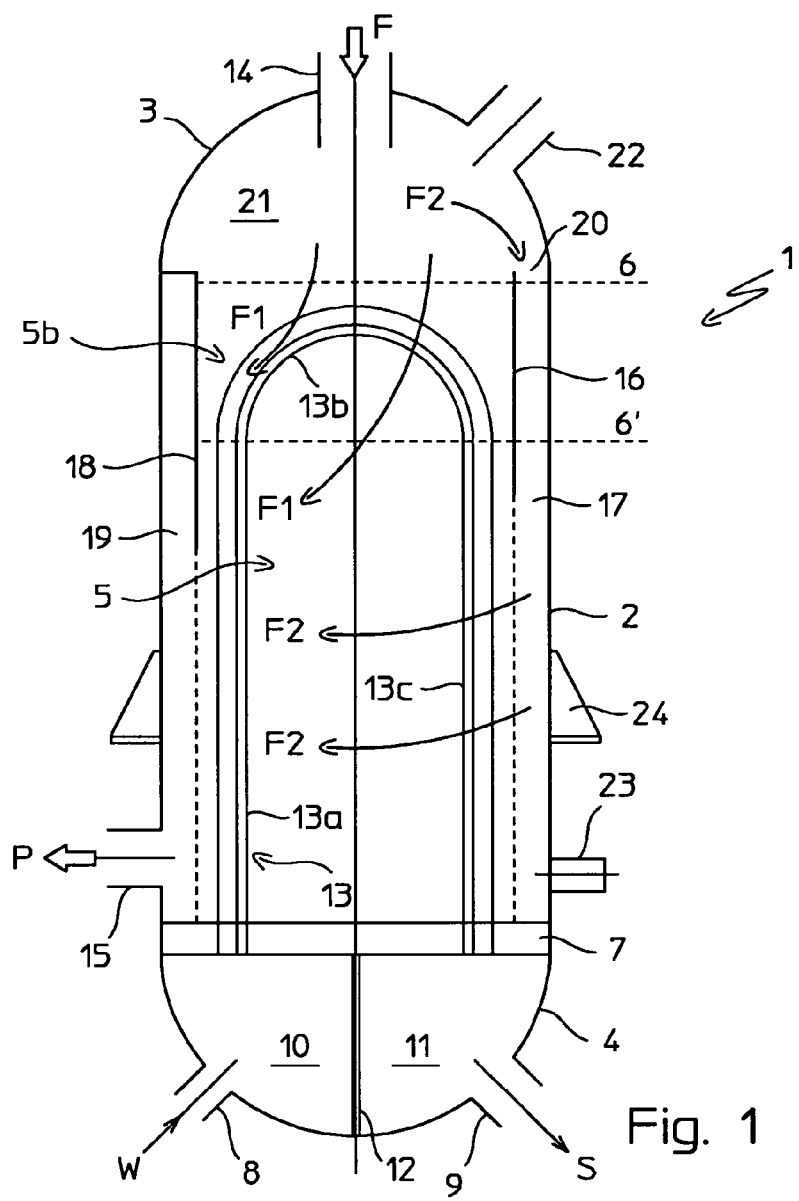
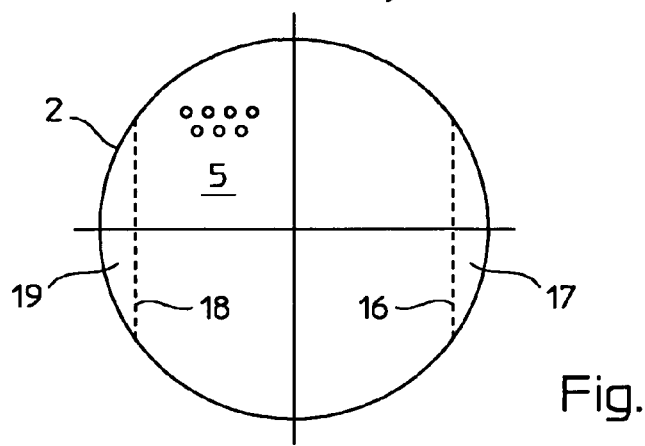

VERTICAL ISOTHERMAL SHELL-AND-TUBE REACTOR

This application is a national phase of PCT/EP2010/061517, filed Aug. 6, 2010, and claims priority to EP 09169231.9, filed Sep. 2, 2009, the entire contents of both of which are hereby incorporated by reference.

FIELD OF APPLICATION

The invention relates to a vertical isothermal shell-and-tube reactor for carrying out a catalytic chemical reaction, for example the synthesis of methanol.

PRIOR ART

Isothermal or pseudo-isothermal chemical reactors are reactors fitted with an internal heat exchanger, usually embedded in a catalytic rack, to keep the temperature of the chemical reaction in an optimum range. A common example is the synthesis of methanol, where the heat exchanger removes the heat of the exothermic synthesis reaction with a suitable cooling fluid, e.g. by converting a boiling water into steam. If the reaction is endothermic, the heat exchanger is fed with a heating medium and provides the heat necessary to sustain the reaction itself.

An isothermal reactor fitted with an internal tube heat exchanger is shortly referred to as tubular reactor.

In a first known arrangement, a tubular reactor is basically a shell containing a fixed tube bundle, and a catalyst accommodated inside the tubes. This arrangement however has a limited maximum production per unit. Referring for example to the synthesis of methanol, a known reactor of this kind gives usually no more than 2000 mtd (metric tons per day) of methanol per unit, while the market demands larger plants of 5000 mtd and more. Installing more units in parallel is quite expensive, so it is preferred to realize one single, larger unit. Moreover, this reactor is relatively large, compared to the output.

A further arrangement has the catalyst distributed outside the tubes. These reactors, in the known art, comprise axial-flow and radial-outward flow units. Axial-flow reactors are also limited in terms of the maximum capability, as the maximum flow rate through the reactor depends substantially on the cross-section and flow speed. The speed of the reactants cannot be increased over a certain value, otherwise pressure losses would be too large; increasing the cross-section, i.e. making a larger shell, means a much more expensive reactor. Radial-outward flow reactors, on the other hand, are known to have a poor heat exchange performance, and make generally more difficult to discharge and refill the catalyst.

For the above reasons, the prior art isothermal tube reactors still need improvements to reach the best compromise between the following requirements: high productivity, high efficiency, low cost and easy discharge/refill of the catalyst.

EP-A-1900424 discloses an isothermal reactor comprising a substantially cylindrical outer shell, a catalytic bed, opposite perforated gas-permeable walls for inlet/outlet of reactants/products, and a heat exchange unit immersed in the catalytic bed. The catalytic bed is delimited laterally by the opposite perforated walls and heat exchangers are arranged substantially parallel to the direction of the gaseous flow crossing the catalytic bed itself.

SUMMARY OF THE INVENTION

The problem underlying the invention is to overcome the above drawbacks of the prior art. In particular, the invention is aimed to an arrangement suitable for a simple and low cost tubular reactor, adapted to treat a large flow rate compared to the dimension.

The problem is solved by an isothermal vertical reactor for a chemical reaction, comprising: a shell with a longitudinal axis; at least a gas inlet for a fresh gas charge and a product outlet; at least a first gas-permeable wall parallel to said axis, and a second gas-permeable wall parallel to said axis, so that a gas-distribution chamber is defined between the first gas-permeable wall and the shell of the reactor, and a product collecting chamber in communication with said product outlet is defined between the second gas-permeable wall and the shell; a catalytic bed accommodated inside the shell, the gas permeable walls of said distribution chamber and collecting chamber facing said catalytic bed, and a heat exchanger embedded in the catalytic bed, the reactor being characterized in that:

the heat exchanger comprises a bundle of U tubes, each of said U tubes having two straight portions connected by a U-shaped portion, thus forming a U-shaped end portion of the tube bundle;

said gas inlet is disposed to direct the fresh charge in an upper chamber of the reactor, over the catalytic bed;

the catalytic bed and the inlet gas-distribution chamber are in communication with said upper chamber of the reactor, so that during the operation of the reactor, a first portion of the fresh charge can enter directly the catalytic bed, passing through the U-shaped end of the tube bundle, and a second portion of the fresh charge can enter the inlet gas-distribution chamber, the first portion flowing in the catalytic bed and towards the collecting chamber with a mixed axial-transversal flow, the second portion flowing in the catalytic bed, from the gas distribution chamber towards the gas collecting chamber, with a substantially transversal flow.

Preferably, said inlet gas-distribution chamber has an upper inlet that is open in the upper chamber of the reactor and located over the maximum level of the catalyst. In a preferred embodiment, the reactor has one distribution chamber and one collecting chamber, defined by two opposite, parallel gas-permeable walls. The gas-permeable walls may be perforated with holes, slots or equivalents, in order to allow the passage of the reactants/products.

In a further preferred embodiment, the gas inlet of the fresh charge comprises at least one inlet distributor nozzle. Preferably said nozzle is mounted on a top cover of the reactor, and more preferably the nozzle is aligned with the main longitudinal axis of the reactor. The nozzle may have a single opening or a plurality of front and/or lateral openings to distribute the fresh charge in said upper chamber of the reactor.

In a preferred embodiment of the invention, the reactor is arranged so that the second portion entering the gas-distribution chamber is greater than the first portion of the fresh charge, entering directly the catalytic bed through the tube bundle. The ratio between said first portion and second portion may vary according to the kind of reaction and size of the reactor; said ratio is preferably in the range 24%-45%.

The tubes of the heat exchanger are preferably fixed to a tube sheet or to a manifold at the bottom of the reactor. The U-shaped portions at the upper part of the tube bundle are preferably semi-circular. The heating or cooling fluid circulating inside the tubes may be any appropriate fluid; in some embodiments the fluid is water.

In a particularly preferred embodiment, the reactor has a top cover, delimiting the upper chamber fed with the fresh gas charge, and comprising an axial gas inlet distributor aligned with the main longitudinal axis, and a manhole. In the bottom part of the shell, there is at least one product outlet, in communication with the product collecting chamber, and one or preferably a plurality of catalyst drop-out openings, to discharge exhausted catalyst.

A preferred application of the invention is a reactor for the synthesis of methanol (methanol converter). A particularly preferred application is a methanol converter where the heat of the reaction is used to produce steam, i.e. the tube heat exchanger is fed with boiling feed water (BFW) and steam or a water/steam mixture is collected at the outlet of the tubes.

The reactor according to the invention has the following advantages. The gaseous flow encounters a low pressure drop while passing through the catalytic bed, thanks to the mixed axial-transversal flow. Hence, the reactor can receive a large flow rate compared to the size and the diameter of the shell. It should be noted that the cost of the reactor is closely related to the diameter.

The invention allows a full exploitation of the available catalyst, because the fresh charge is uniformly distributed into the catalytic bed through the permeable wall of the distribution chamber and the open upper part of the bed, allowing to treat a larger flow rate with a low pressure drop of the reactants/products, on the shell side of the heat exchanger.

The main items of the reactor are relatively simple, being only the shell, the tube bundle, one tube sheet or tube manifold, and the internal gas-permeable walls. This helps to reduce costs.

Another advantage is the easy access to the catalytic bed for maintenance. The catalytic bed, being open into the upper chamber of the reactor, can easily be accessed from top of the reactor, while the catalyst can be discharged from the bottom drop-outs. The invention provides an open-top basket arrangement and the operation of replacing an old (exhausted) catalyst is made simpler and faster.

The features and advantages of the present invention shall be more evident from the description, hereinafter provided for exemplifying and non-limiting purposes, with reference to the drawings attached.

BRIEF DESCRIPTION OF THE DRAWINGS

FIG. 1 is a schematic longitudinal section of a reactor according to a preferred embodiment of the invention.
FIG. 2 is a schematic cross section of the reactor of FIG. 1.

DETAILED DESCRIPTION

Referring to FIG. 1, a vertical reactor 1 for a chemical reaction, for example a methanol converter, has a shell 2 with a longitudinal axis A-A, closed by a top cover 3 and bottom cover 4.

A tube heat exchanger 5 is contained in the reactor 1 and embedded in a catalytic bed. The heat exchanger 5 is a tube heat exchanger, with a plurality of U-shaped tubes fixed to a bottom tube sheet 7. In alternative embodiments, the tubes may be connected to a manifold.

The catalyst, e.g. in the form of solid particles, fills the reaction space from said tube sheet 7 up to a maximum level 6. In operation, the catalyst will consolidate and/or shrink bringing the catalytic bed to a lower level 6'. In operation, the available space for the isothermal reaction is then comprised between the bottom sheet 7 and the top level 6' of the catalytic bed. In this space of reaction, the reactants and products are kept in a substantially isothermal condition.

The top cover 3 is equipped with an inlet nozzle 14 for a fresh gas charge F of reactants. The products P of the chemical reaction are delivered at outlet 15, in the bottom region of the shell 2.

The heat exchanger 5 is adapted to maintain the temperature of the catalytic bed in a predetermined range, compensating for the heat produced or absorbed by the chemical reaction. To this purpose, a suitable heat exchange fluid is fed to the tube side of the exchanger 5, entering at inlet 8 on the bottom cover 4, and exiting at an outlet 9 on the same cover 4. Heat exchange fluid distribution chamber 10 and collecting chamber 11 are delimited by a partition wall 12.

Each U-shaped tube of the heat exchanger 5 has two straight portions connected by a U-turn. One of the tubes is shown in FIG. 1 as 13, having a straight portion 13a, fixed to the sheet 7 and in communication with the fluid distribution chamber 10, a U-shaped portion 13b, and another straight portion 13c, fixed to the sheet 7 and in communication with the fluid collecting chamber 11. The U-shaped portion 13b connects the straight portions 13a and 13b. Hence, the whole tube bundle of the exchanger 5 has a U-shaped top portion 5b, formed by the U-shaped portions of the tubes.

The reactor 1 also comprises a gas-permeable perforated wall 16, parallel to the axis A-A and defining a lateral gas distribution chamber 17, and an opposite gas-permeable perforated wall 18 defining a lateral product collecting chamber 19. The product outlet 15 is in communication with said collecting chamber 19.

The distribution chamber 17 and the product collecting chamber 19 are defined between the shell 2 and the perforated walls 16 and 18, respectively. The catalytic bed is accommodated between said perforated walls, so that the perforated walls face the catalytic bed and hence the space of reaction inside the reactor 1.

Preferably the gas-permeable walls are parallel and opposite, as shown, but alternative embodiments are possible, e.g. with a plurality of gas permeable walls and corresponding distribution and collecting chambers. The arrangement of the distribution chamber 17 and collecting chamber 19, in the given example, can be appreciated further in the cross section of FIG. 2.

The distribution chamber 17 has an upper inlet opening 20, over the maximum level 6 of the catalyst, open in an upper chamber 21 of the reactor 1. Said chamber 21 is over the catalytic bed and substantially delimited by the top cover 3. The catalytic bed is open in direct communication with said upper chamber 21 of the reactor.

A manhole 22 is also provided on the top cover 3. One or more catalyst drop-outs 23 are provided on the shell 2. Suitable supports 24 are fixed on the shell 2, for vertical mounting. In operation the manhole 22 and the catalyst drop outs 23 are closed with dead flanges. Other features such as pressure gauges, thermocouples, etc. . . . are realized according to known art.

The nozzle 14 and the distribution chamber 17 are arranged so that a first portion F1 of the fresh charge F enters directly the catalytic bed, flowing from the upper chamber 21 of the reactor through the U-shaped top portion 5b of the heat exchanger 5 and into the catalytic bed, and then towards the perforated wall 18 and collecting chamber 19, with an axial-transversal flow indicated by the arrows in FIG. 1.

A second portion F2 of the fresh charge F enters the opening 20 of the distributor 17 and then flows through the perforated wall 16 and the catalytic bed, reaching the chamber 19 with a substantially transversal (horizontal) flow.

Preferably, said second portion F2 is greater than said first portion F1. It should be noted that feeding a portion of the charge F via the distributor 17 allows a full exploitation of the available catalyst, namely also the lower part which is far from the nozzle 14. This helps to maintain a uniform isothermal reaction throughout the catalytic bed and maximize production of the reactor 1. On the other hand, feeding at least a portion directly into the catalytic bed allows for a completely open-top basket, making it easy to load the catalyst.

The operation of the reactor 1 is as follows. The fresh charge F enters the top chamber 21 of the reactor 1 via the nozzle 14. A portion of the charge F, corresponding to flow lines F1, passes directly from the chamber 21 to the open-top catalytic bed, flowing through the tube bundle, and then through the perforated wall 18 of the collecting chamber 19, with an axial-transversal flow. The remaining part F2 is lead into the distribution chamber 17, via the opening 20, flowing into the catalytic bed with a substantially transversal flow. The products are collected in the chamber 19 and exit from the outlet 15.

A preferred but not exclusive application is the synthesis of methanol. In this case, the charge F is a suitable make-up synthesis gas, and the heat exchanger 5 has the duty to remove the heat produced by the exothermic reaction of synthesis of methanol. Preferably, the heat exchange fluid is boiling water entering at the flange 8 and at least partially evaporating inside the tubes, so that outlet 9 delivers a steam or mixed water/steam flow.

The invention claimed is:

1. An isothermal vertical reactor for a chemical reaction, comprising:
   a shell with a longitudinal axis;
   at least a gas inlet for a fresh gas charge and a product outlet;
   at least a first gas-permeable wall parallel to said longitudinal axis, and a second gas-permeable wall parallel to said longitudinal axis, so that an inlet gas distribution chamber is defined between the first gas-permeable wall and the shell of the reactor, and a product collecting chamber in communication with said product outlet is defined between the second gas-permeable wall and the shell;
   a catalytic bed accommodated inside the shell, the gas permeable walls of said inlet gas distribution chamber and said product collecting chamber facing said catalytic bed; and
   a heat exchanger embedded in said catalytic bed, the heat exchanger comprising a bundle of U tubes, each of said U tubes having two straight portions fixed to a bottom tube sheet or manifold and connected by a U-shaped portion, thus forming a U-shaped end portion of the tube bundle, wherein a first straight portion of said U tubes fixed to said bottom tube sheet or manifold is in communication with a fluid distribution chamber while a second straight portion of said U tubes fixed to said bottom tube sheet or manifold is in communication with a fluid collecting chamber, said fluid distribution chamber and said fluid collecting chamber being delimited by a partition wall;
   wherein said gas inlet is disposed to direct the fresh charge in an upper chamber of the reactor, over the catalytic bed, and
   wherein the catalytic bed and the inlet gas distribution chamber are in communication with said upper chamber of the reactor, so that during operation of the reactor, a first portion of the fresh charge can enter directly the catalytic bed, passing through the U-shaped portion of the tube bundle, and a second portion of the fresh charge can enter the inlet gas-distribution chamber, the first portion flowing in the catalytic bed and towards the product collecting chamber with a mixed axial-transversal flow, and the second portion flowing in the catalytic bed, from the inlet gas distribution chamber towards said product collecting chamber, with a substantially transversal flow.

2. The reactor according to claim 1, wherein said inlet gas distribution chamber has an upper inlet opening, located in the upper chamber of the reactor and over the maximum level of the catalyst of said catalytic bed.

3. The reactor according to claim 1, wherein the reactor has one inlet gas distribution chamber and one product collecting chamber defined by two opposite, parallel gas-permeable walls.

4. The reactor according to any of the previous claim 1, wherein said gas inlet comprises at least one distributor nozzle.

5. The reactor according to claim 4, wherein said at least one distributor nozzle is provided on a top cover of said reactor and aligned with said longitudinal axis.

6. The reactor according to claim 1, wherein the shell comprises at least one catalyst drop-out.

* * * * *